(12) United States Patent
Plank (10) Patent No.: US 11,874,403 B2
(45) Date of Patent: Jan. 16, 2024

(54) REFLECTANCE SENSING WITH TIME-OF-FLIGHT CAMERAS

(71) Applicant: Infineon Technologies AG, Neubiberg (DE)

(72) Inventor: Hannes Plank, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1279 days.

(21) Appl. No.: 16/414,969

(22) Filed: May 17, 2019

(65) Prior Publication Data

US 2020/0363512 A1 Nov. 19, 2020

(51) Int. Cl.

| | |
|---|---|
| *G01C 3/08* | (2006.01) |
| *G01S 7/4865* | (2020.01) |
| *G01S 7/48* | (2006.01) |
| *G01S 7/4863* | (2020.01) |
| *G01S 17/10* | (2020.01) |
| *G01S 17/89* | (2020.01) |

(52) U.S. Cl.
CPC .......... *G01S 7/4865* (2013.01); *G01S 7/4802* (2013.01); *G01S 7/4863* (2013.01); *G01S 17/10* (2013.01); *G01S 17/89* (2013.01)

(58) Field of Classification Search
CPC .... G01S 7/4865; G01S 7/4802; G01S 7/4863; G01S 17/10; G01S 17/89; G01S 7/4915; G01S 7/497; G01S 17/894; G01S 7/4861
See application file for complete search history.

(56) References Cited

U.S. PATENT DOCUMENTS

2016/0178512 A1 6/2016 Hall et al.
2018/0278910 A1* 9/2018 Schoenberg ............ G01S 11/00

* cited by examiner

*Primary Examiner* — Samantha K Nickerson
(74) *Attorney, Agent, or Firm* — Murphy, Bilak & Homiller, PLLC (57) ABSTRACT

Techniques for obtaining reflectance measurements using a time-of-flight (ToF) measurement device. An example method comprises obtaining a distance measurement, using one or more pixels in a ToF sensor, obtaining an intensity measurement corresponding to the distance measurement, using the one or more pixels, and calculating a reflectance value, based on the distance measurement, the intensity measurement, and a reflectance calibration factor. In some embodiments, the calibration distance is obtained by measuring a reference distance to a calibration surface, using a reference pixel in the ToF sensor, and obtaining the calibration distance from the measured reference distance. In some of these embodiments, the reflectance calibration factor is obtained by obtaining a reference intensity corresponding to the reference distance, using the reference pixel, and calculating the reflectance calibration factor for the one or more pixels as a function of the reference intensity and a viewing angle for the one or more pixels.

30 Claims, 6 Drawing Sheets

REFLECTANCE SENSING WITH TIME-OF-FLIGHT CAMERAS

TECHNICAL FIELD

The present disclosure is generally related to time-of-flight (ToF) measurements and is more particularly related to techniques for obtaining reflectance measurements using a ToF sensor.

BACKGROUND

In optical sensing applications, depth measurements, i.e., measurements of the distance to various features of an object or objects in view of an image sensor may be performed as so-called time-of-flight (ToF) measurements, which are distance measurements determined using the speed of light and image/pixel sensors. The distance to an object of interest is typically calculated per pixel and, once calculated, can be used for depth detection, gesture identification, object detection, and the like. The distance per pixel is combined to create a depth map that provides a three-dimensional image. ToF measurement technology is increasingly being found in portable electronic devices, such as cellular phones and "smart" devices.

Many conventional approaches to TOF measurements require multiple sequential exposures, also referred to as copies. Each exposure requires that light generated from a light source be amplitude modulated using a modulating signal at a respective phase with respect to a reference signal applied to the pixels that demodulate light reflected from an object or objects of interest, the phase being different for different exposures. For example, one approach requires four separate exposures, with the phase of the modulating signal at 0°, 90°, 180° and 270°, respectively, with respect to the reference signal. Measurement information from the four exposures is collected and compared to determine a depth map. For high-precision measurements, with extended unambiguous ranges, even more exposures, e.g., as many as nine separate raw measurements, may be performed. This conventional approach, as well as several variants and supporting hardware, are described in detail in co-pending U.S. patent application Ser. No. 16/176,817, titled "Image Sensor with Interleaved Hold for Single-Readout Depth Measurement," filed 31 Oct. 2018, the entire contents of which are incorporated herein by reference, for the purpose of supplying background to the present disclosure.

SUMMARY

Described herein are techniques for measuring the reflectance of an imaged object or objects, for each pixel of a time-of-flight (ToF) sensor. In this context, the reflectance is the effectiveness of an object's or material's surface in reflecting radiant energy, and can be understood as the percentage of light illuminating the object's or material's surface reflected back to the ToF sensor. Using the calibration and measurement techniques described below, a ToF sensor can be used to produce a reflectance map, along with a depth map. This can be used, for example, to classify imaged materials, and/or to provide additional data for object and face recognition. The reflectance data might also be used, for example, to detect skin color, or to detect sweat on human skin.

Embodiments described in detail below include an example method for reflectance measurement, as implemented in a time-of-flight (ToF) measurement device. This example method includes the step of obtaining a distance measurement, using one or more pixels in a ToF sensor, and obtaining an intensity measurement corresponding to the distance measurement, using the same one or more pixels. The method further comprises calculating a reflectance value for the one or more pixels, based on the distance measurement, the intensity measurement, and a reflectance calibration factor. These steps may be carried out for each of several (or many) pixels or pixel groups, using reflectance calibration factors that are specific to the respective pixels or pixel groups.

In some embodiments, calculating the reflectance value comprises multiplying the intensity measurement by the reflectance calibration factor and by a factor proportional to the square of the distance measurement. In some embodiments, for instance, the reflectance value for each pixel i, j is calculated according to $R_{i,j}=c_{i,j}I_{i,j}(d_{i,j}/d_{calib})^2$, where: $R_{i,j}$ is the calculated reflectance value for pixel i, j; $c_{i,j}$ is the reflectance calibration factor for pixel i, j; $I_{i,j}$ is the measured intensity for pixel i, j; $d_{i,j}$ is the distance measurement for pixel i, j; and $d_{calib}$ is a reflectance calibration distance.

In some embodiments, the ToF measurement device obtains the calibration distance by measuring a reference distance to a calibration surface, e.g., using a reference pixel in the ToF sensor having a viewing angle aligned with the optical axis of the ToF sensor, and obtaining the calibration distance from the measured reference distance. In some embodiments, the ToF measurement device calculates the reflectance calibration factor for each of the respective pixels or groups of pixels as a function of a viewing angle for the pixel or group of pixels or a distance to a calibration surface measured by the pixel or group of pixels, or both, and a reference reflectance.

In some embodiments, for instance, the reflectance calibration factors are obtained by, for each pixel or group of pixels: measuring an intensity of reflection from the calibration surface for the pixel or group of pixels; scaling the measured intensity, based on the viewing angle for the pixel or group of pixels, with respect to the optical axis of the ToF sensor; and calculating the reflectance calibration factor for the pixel or group of pixels as a function of the scaled measured intensity and a reference reflectance. In some of these embodiments, the ToF measurement device measures a distance to the calibration surface for each pixel or group of pixels and calculates the scaled measured intensity for each pixel or group of pixels according to $$L_{i,j} = I_{i,j}\left(\frac{dc_{i,j}}{d_{calib}}\right)^2\left(\frac{1}{\cos\beta_{i,j}}\right),$$

where: $L_{i,j}$ is the scaled measured intensity for pixel i, j; $I_{i,j}$ is the measured intensity for pixel i, j; $dc_{i,j}$ is the measured distance to the calibration surface for pixel i,j; $\beta_{i,j}$ is the viewing angle of pixel i, j, with respect to the optical axis of the ToF sensor; and $d_{calib}$ is the calibration distance.

Reflectance values calculated according to the techniques disclosed herein may be used to normalize pixel values or groups of pixel values in a two-dimensional image, for example. This could be used for machine-learning purposes, for example, allowing intensity values to be mapped to a fixed scale that is independent of the distance. As another example, reflectance values calculated according to these techniques may be used to form a reflectance image, or to form a three-dimensional point-cloud comprising the distance measurements and the corresponding reflectance values.

Apparatuses corresponding to the methods summarized above and detailed below are also illustrated in the attached figures and described below.

DETAILED DESCRIPTION

The present invention will now be described with reference to the attached drawing figures, wherein like reference numerals are used to refer to like elements throughout, and wherein the illustrated structures and devices are not necessarily drawn to scale. In this disclosure, the terms "image" and "image sensor" are not limited to images or sensors involving visible light but encompass the use of visible light and other electromagnetic radiation. Thus, the term "light" as used herein is meant broadly and refers to visible light as well as infrared and ultraviolet radiation.

Figure 1:
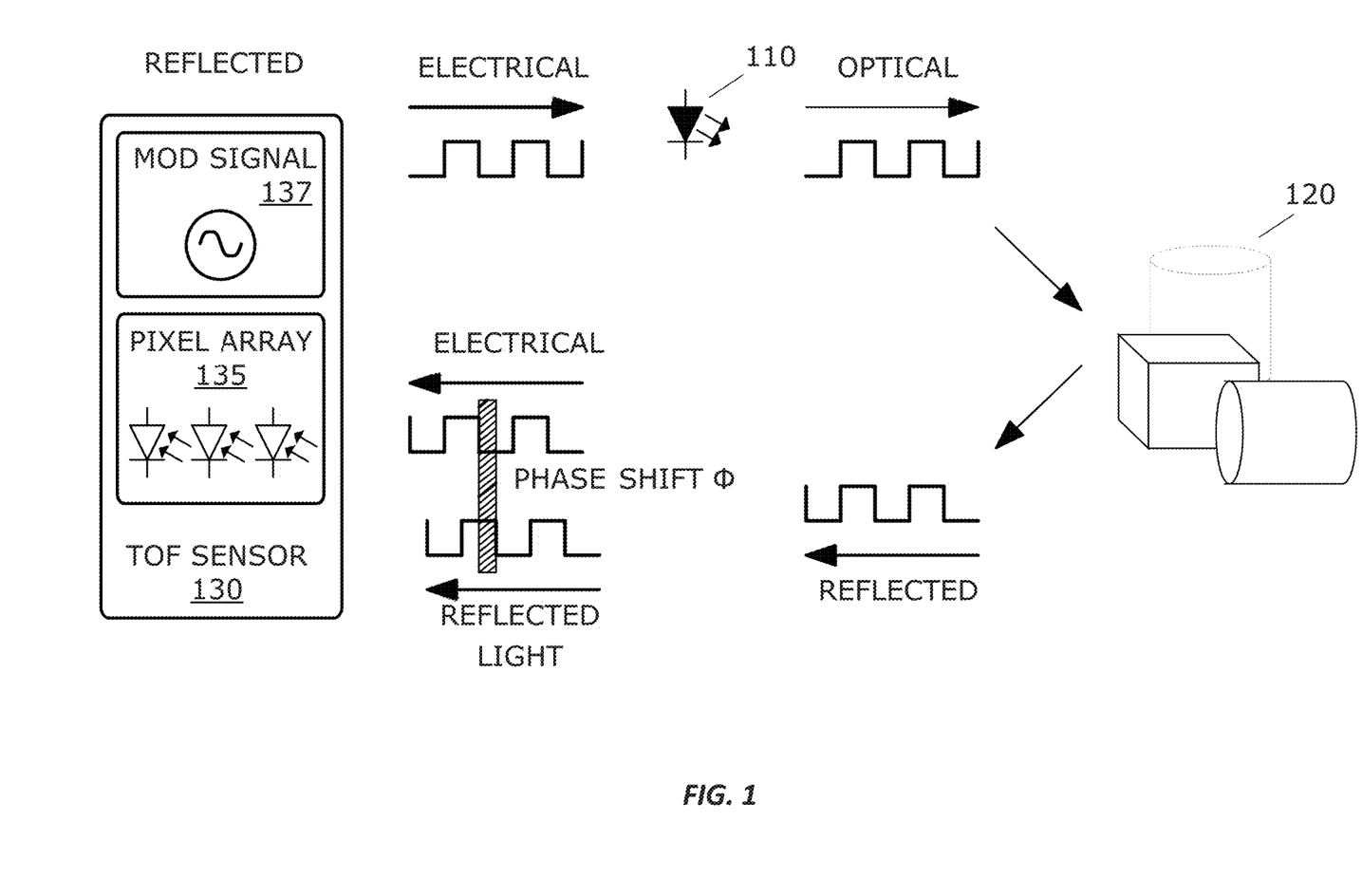
FIG. 1 is a diagram illustrating a system for time of flight (ToF) measurement according to some of the embodiments described herein.

FIG. 1 illustrates the basic principles of continuous-wave (CW) time-of-flight (TOF) measurements, which are well known. A light source 110, such as a light-emitting diode (LED) or vertical-cavity surface-emitting laser (VCSEL), is modulated with an electrical signal (e.g., a radio-frequency sinusoid at, for example, 300 MHz), so that the light source 110 emits an amplitude-modulated optical signal towards the target scene 120. Traveling at the speed of light c, the light signal reflects from an object or objects in the scene 120 and arrives back at a pixel array 135 in the TOF sensor 130, with the time of flight to the target scene 120 and back imposing a phase shift of Ø on the optical signal as received at the pixel array 135, relative to the originally transmitted optical signal.

The modulation signal 137 used to modulate the emitted light, or a phase-shifted version of it, is also supplied as a reference signal to the pixels in pixel array 135, to be correlated with the modulation signal superimposed on the reflected optical signal—in effect, the reflected optical signal is demodulated by each pixel in the pixel array 135.

Figure 2:
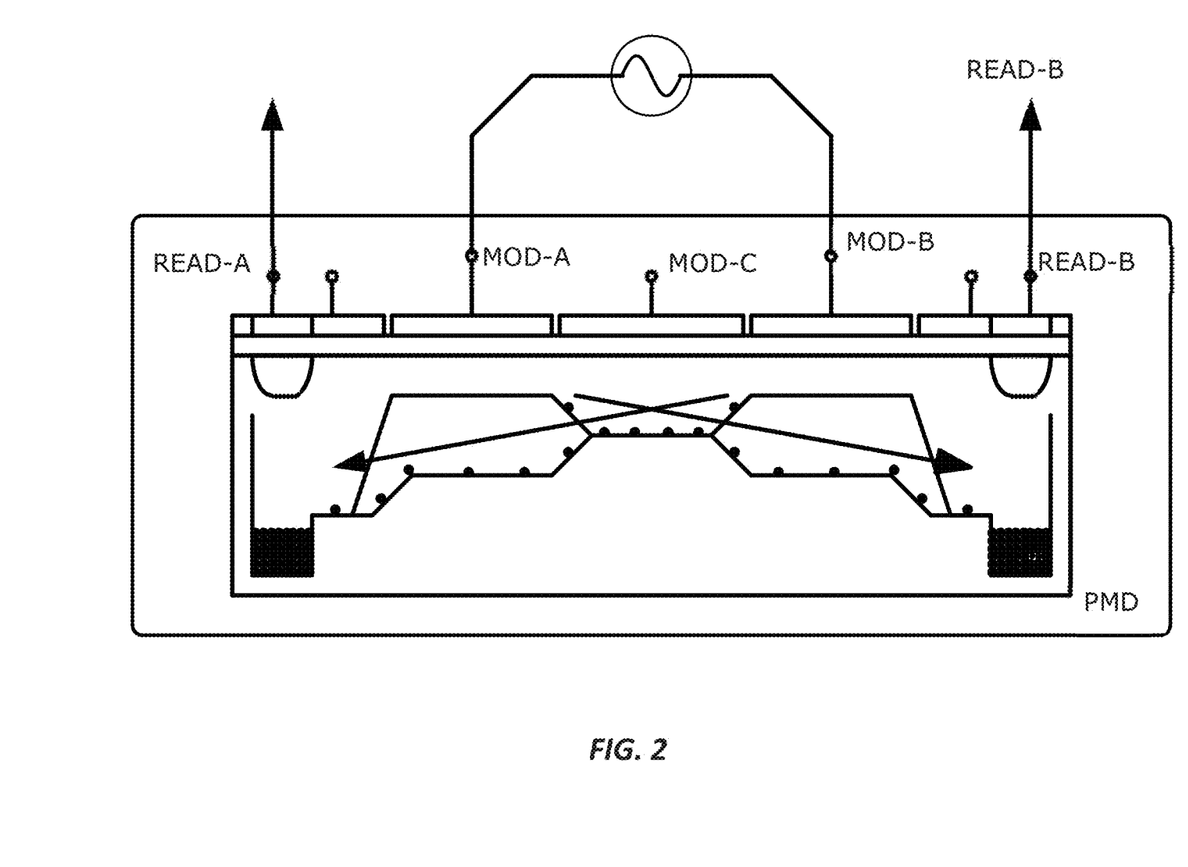
FIG. 2 illustrates an example photonic mixing device (PMD).

While the structure and design of light-sensing pixels may vary, each of the pixels in pixel array 135 may in some instances be a photon mixing device, or PMD. FIG. 2 illustrates the basic structure of an example PMD, which includes readout diodes A and B and modulation gates A and B. A reference signal is applied differentially across the modulation gates A and B, creating a gradient in electric potential across the p-substrate, while incoming light is received at a photo gate/diode. A differential sensor signal is generated across the readout diodes A and B. The sensor signal from a pixel may be integrated for a period of time to determine phase measurement information.

The difference between voltages at the Read-A and Read-B nodes of the PMD corresponds to the correlation between the modulated optical signal detected by the photosensitive diode structures in the illustrated device and the reference signal, which is applied between the Mod-A and Mod-B nodes of the device. Thus, the PMD (and other light-sensitive pixel structures) demodulate the modulated optical signal reflected from the target scene 120, producing a pixel signal value (in this case the difference between voltages at Read-A and Read-B) indicative of the distance traveled by the reflected optical signal, as discussed in further detail below.

While the modulation signal may take any of a variety of forms, the principle behind this correlation/demodulation is most easily seen with a sinusoidal signal as a modulation signal. If the modulation signal g(t) and the received signal s(t) with modulation amplitude 'a' and phase shift 'Ø' are given as:

$$m(t)=\cos(\omega t), \text{ and}$$

$$s(t)=1+(a\times\cos(\omega t+\emptyset))$$

then the correlation of the received signal with the reference signal gives:

$$r(\tau) = \left(\frac{a}{2}\right)\cos(\emptyset + w\tau),$$

which is a function of the phase difference Ø between the two signals. It will be appreciated that with a periodic modulation signal, this correlation can be carried out for an extended period of time, e.g., several cycles of the modulating signal, to improve the signal-to-noise ratio of the resulting measurement.

Figure 3:
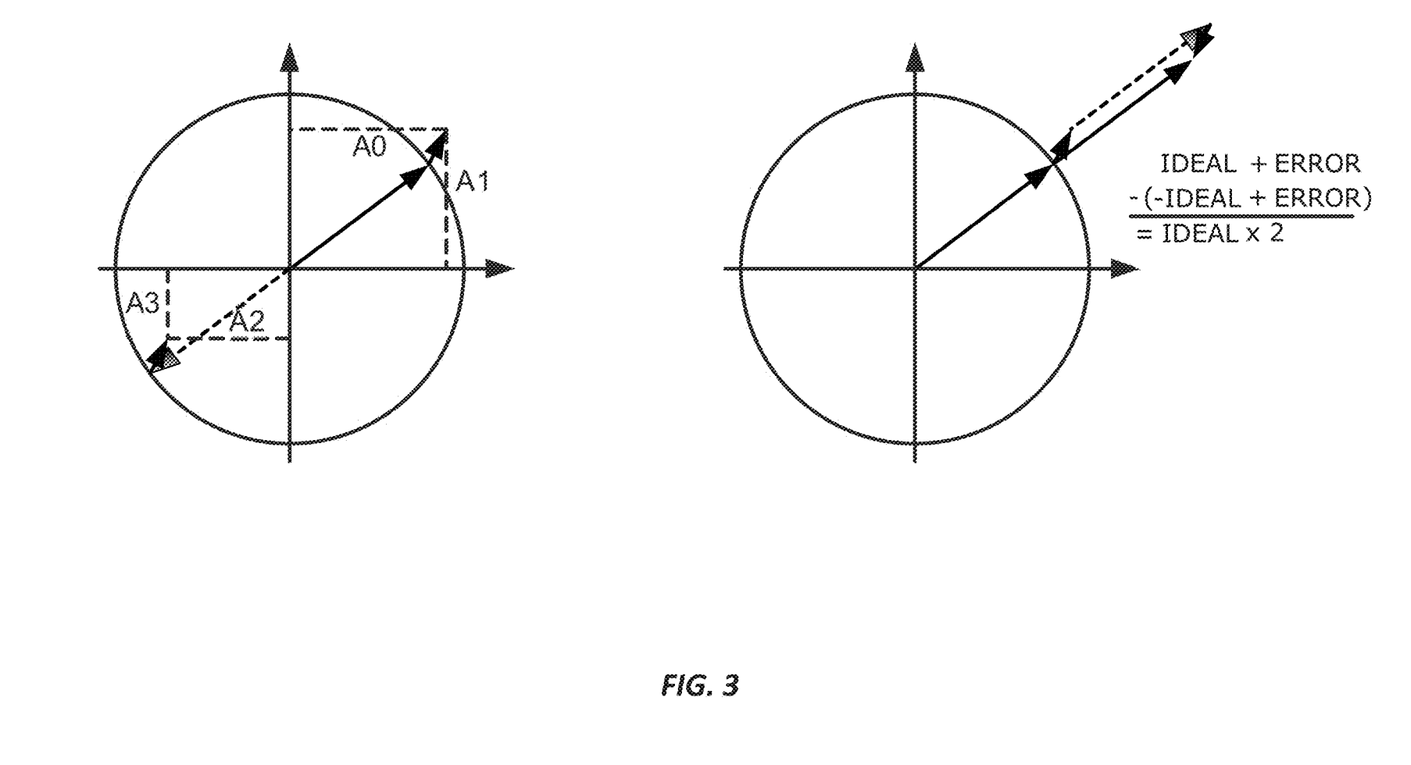
FIG. 3 is a diagram illustrating principles of phase measurement according to time-of-flight (TOF) techniques.

The phase difference between the emitted optical signal and the received reflection of that signal, which is proportional to the distance traveled by the optical signal, can be extracted by an N-phase shifting technique. This requires sampling the correlation function at N different points, e.g., by performing correlations using N different phase shifts of the reference signal, with respect to the modulating signal g(t). At least two measurements are required to calculate this phase shift, and hence to determine the distance traveled. This is often done using four different phase shifts, at 0, 90, 180, and 270 degrees, as this allows for a simple cancellation of systematic offsets in the correlation results. This is seen in FIG. 3, which shows how the correlations A0 and A1, at 0 and 90 degrees, respectively, correspond to a first phase vector having an "ideal" component corresponding to the actual difference traveled by the optical signal and a systematic component reflecting systematic error in the measurements and readout. Likewise, the correlations A2 and A3, at 180 and 270 degrees, respectively, correspond to a second phase vector pointing in the opposite direction, with an exactly opposite "ideal" component and an identical systematic component. In the figure, the ideal components are represented by the vectors extending from the origin to the circle, while the systematic error components are represented by the smaller vectors. The actual phase Ø can then be calculated as follows:

$$\emptyset = \arctan\left(\frac{A1-A3}{A2-A0}\right).$$

(It will be appreciated that the above expression is valid only when A2-A0 is greater than zero. The well-known "a tan 2(y,x)" function can be used to provide a correct conversion to a phase vector for all cases, including where A2-A0 is less than zero.)

From this phase, the distance, or "depth" to the target scene 120 can be calculated as follows:

$$D = \frac{cx\emptyset}{4\pi f_{mod}},$$

where $f_{mod}$ is the frequency of the modulating signal. It will be appreciated that because of "phase wrapping," this distance calculation has an ambiguous result, as it is not possible to tell from a single distance calculation whether the distance traveled is less than a single wavelength of the modulating waveform, or multiple wavelengths. Various techniques for resolving this ambiguity are well known, e.g., by incorporating amplitude information obtained from the reflected optical signal, and/or repeating the measurement with a different modulating frequency, but a detailed discussion of these techniques is unnecessary to a full understanding of the presently disclosed techniques and is thus beyond the scope of the present disclosure.

In addition to the distance/depth measurements described above, intensity measurements for each of the pixels of a ToF camera or, more generally, a ToF sensor, can be obtained from the correlations described above. More particularly, the light intensity is the amplitude of the autocorrelation function. For the four-phase measurement discussed above, the light intensity can be calculated as:

$I = \text{sqrt}((A1-A3)^2 - (A2-A0)^2)/2.$

These intensity measurements can in turn be used to measure the amount of light reflected from an object. Because of the modulated illumination signal used to perform the distance measurements, other light sources, such as sunlight or background lighting, do not influence these intensity measurements. Rather, the external influences on the intensity measurement value for a given pixel are the reflectance of the object or material imaged by the pixel and the distance from the ToF illumination unit to the imaged object or material and back to the pixel. Internal influences on the intensity measurement value include the intensity of the illumination, in the direction of the imaged object or material, the sensitivity of the pixel, and the measurement time.

Described herein are techniques for compensating the influence of the distance to the object, so that a reflectance value for the imaged object or material can be obtained from the intensity measurement for a pixel. These techniques may also be used to compensate for variations in illumination intensity across a field of view, as well as for variations in pixel sensitivity.

Reflectance from a surface depends on the surface angle α, which is the angle between the surface of the object, at a point viewed by a given pixel, and the ray extending from the object at that point to the pixel. (It will be appreciated that a given pixel has a viewing region in the shape of a cone, and that the intersection of this cone with an imaged object creates a viewed area, rather than a point. Thus, references herein to a "point" on an object viewed by a given pixel should be understood as referring to a point at or near the center of this area.) The reflectance measurements obtained by the techniques described herein will generally indicate the proportion of light reflected by the object or material back toward the pixel of interest, corrected for distance. If the surface angle α can be calculated, e.g., by evaluating distance measurements for the pixel and several pixels around it or by fitting a three-dimensional (3D) model of the object to ToF distance data obtained from the ToF sensor, it is also possible to derive, for each pixel, a reflectance value R for α=0, i.e., the reflectance at a given point on the object or material that would be observed if that point was observed straight on, i.e., at α=0, rather than at an angle. This reflectance value, which might be denoted R(α=0), can be used to derive material properties, such as skin color, skin sweat, or the type of material.

In either case, i.e., whether the reflectance values are compensated only for distance or R(α=0) are obtained, the reflectance provides a unique way to sense a representation of an object. It provides additional information for object recognition applications, such as face identification and gesture detection. In many of these applications, the dependence on angle α does not matter, since the object classification model may be learned from many different angles anyway.

A first step to be able to measure reflectance is camera calibration. As suggested above, each pixel in a ToF sensor may have variations in sensitivity. Furthermore, the illumination unit illuminating the object(s) or material of interest may not produce a uniform light distribution. Furthermore, obtaining a reference is required to have a scale for the sensed reflectance.

One approach to calibration is to take a single intensity and depth image of a planar, diffuse, calibration surface, which is arranged so that the optical axis of the ToF sensor is normal to the calibration surface. This can be done, for example, when each ToF camera is calibrated during manufacturing. Alternatively, this might be performed for a ToF camera of a particular design, with the calibration results being used for similar cameras.

One step of this calibration process is to transform the intensity measurement $I_{i,j}$ for each pixel i,j, as obtained from imaging the planar calibration surface, to a virtual sphere S, having its center at the optical center of the ToF sensor. It will be appreciated that intensity measurements, depth measurements, and the like may be performed on a pixel-by-pixel basis, or for a small group of neighboring pixels. For simplicity, the following discussion will refer to individual pixels arranged in a rectangular array, such that they can be conveniently indexed with indices i and j. However, it should be appreciated that a group of neighboring pixels may generally be substituted for each pixel in this discussion, and that these pixels or groups of pixels may be arranged in configurations other than a rectangular array. Thus, references to a "pixel i,j" may be understood to refer to an arbitrary pixel or group of pixels in a ToF sensor.

To transform each intensity measurement $I_{i,j}$ obtained from the imaging of the calibration surface to the virtual sphere, the intensity that would be reflected from the sphere is calculated. Since the center of the sphere is located at the optical center of the camera, and since a uniform reflectance is assumed for the calibration surface and the virtual sphere, a perfect pixel should produce the same value, when sensing the virtual sphere, assuming uniform illumination. Of course, the pixel sensitivities will vary, as will the illumination. Accordingly, a second step of the calibration procedure is to establish a correction factor, or reflectance calibration factor $c_{i,j}$ r, for each pixel.

Figure 4:
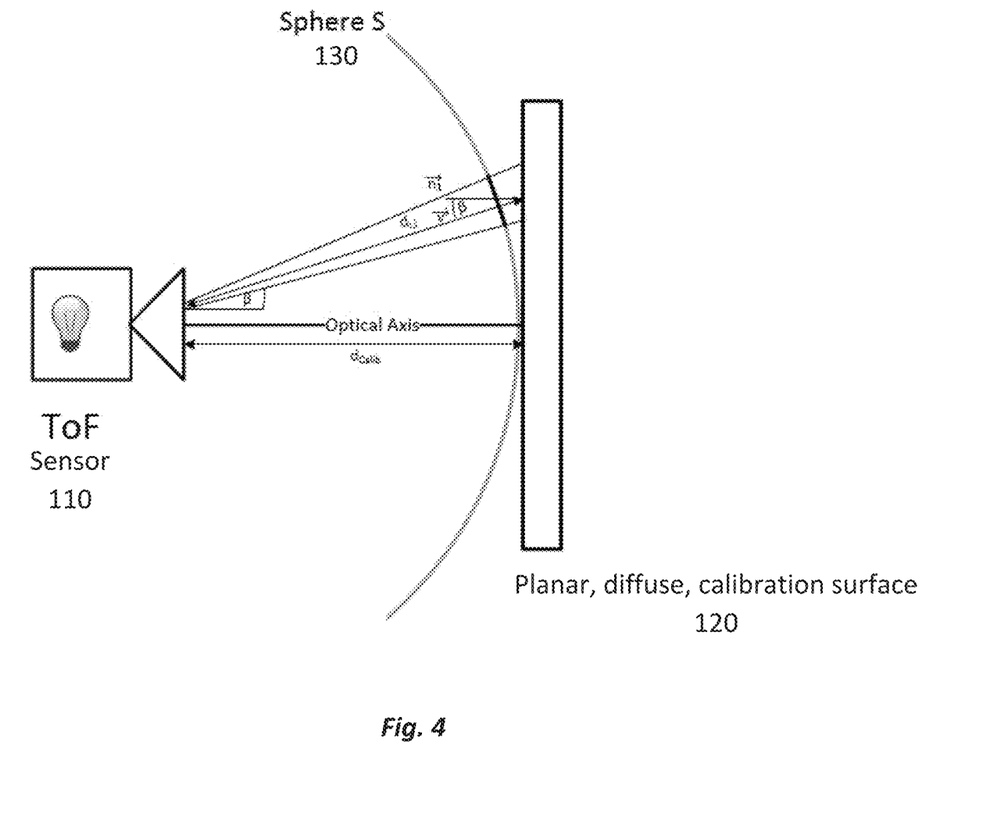
FIG. 4 illustrates principles of an example calibration process, according to some of the embodiments described herein.

To transform the values onto the sphere requires compensating for the different orientation of the planar calibration surface, relative to the virtual sphere, as well as compensating for the different distances from the ToF to the calibration surface and from the ToF sensor to the virtual sphere. This can be seen in FIG. 4, which illustrates a ToF sensor 110 arranged with its optical axis pointing directly at planar, diffuse, calibration surface 120. For simplicity, it is assumed that the illumination source, which emits modulated light towards calibration surface 120, is at the optical focal point of the ToF sensor 110; the same assumption is made for the pixels of the ToF sensor 110. The distance from the optical focal point of the ToF sensor 110 to the planar calibration surface 120 is denoted $d_{calib}$ in FIG. 4, and is the radius of a virtual sphere 130, which has its center at the optical focal point of ToF sensor 110 and which touches calibration surface 120. In some embodiments, at least one pixel on the ToF sensor 110 may view the calibration surface 120 directly along the optical axis of the ToF sensor—this pixel may be regarded as the "reference pixel." Other pixels will have various viewing angles $\beta_{i,j}$, with respect to the optical axis. The distance from each of those pixels to the calibration surface 120 is denoted $d_{i,j}$ in FIG. 4. Given the assumptions noted above, it can be shown that if the calibration surface 120 and the ToF sensor 110 are oriented so that the sensor's optical axis is perfectly normal to the calibration surface 120, then:

$$d_{i,j} = d_{calib}/\cos \beta_{i,j},$$

Thus if the viewing angles $\beta_{i,j}$ of each pixel are known and the precise geometry of the calibration setup is known, the distances $d_{i,j}$ can be calculated. Alternatively, of course, these distances can simply be measured, using the ToF sensor 110's distance measuring capability.

Using the calibration setup shown in FIG. 4, each of the pixels in ToF sensor 110 can measure an intensity $I_{i,j}$ of the light reflected by the calibration surface from the area viewed by the pixel back towards the ToF sensor 110. That intensity $I_{i,j}$ can be transformed to a "virtual" intensity measurement representing the intensity that would be observed if the planar calibration surface 120 had the shape of virtual sphere 130—in other words, the measured intensity $I_{i,j}$ can be translated to the virtual sphere 130. This requires two compensations. First, the difference in distance, i.e., from $d_{i,j}$ to $d_{calib}$, can be addressed by applying the inverse square law. Second, the different angle, i.e., from $\beta_{i,j}$ to 0, can be addressed with Lambert's cosine law, given the assumption that the calibration surface 120 is diffuse. (It can be shown that the angle $\beta$ between the surface normal vectors $n_1$ and $n_2$ of the calibration surface 120 and the virtual sphere 130 is the same as the viewing angle $\beta_{i,j}$ for the pixel of interest, i.e., the angle between the optical axis of the ToF sensor and the center of the pixel's view.) The result is that the "virtual" intensity on the virtual sphere 130 can be expressed as:

$$L_{i,j} = I_{i,j} * \frac{d_{i,j}^2}{d_{calib}^2} * \frac{1}{\cos\beta_{i,j}}. \quad (1a)$$

Given the assumptions discussed above, i.e., this can be alternatively expressed as:

$$L_{i,j} = I_{i,j} * \frac{1}{(\cos\beta_{i,j})^3}. \quad (1b)$$

Likewise, under these same assumptions, the virtual intensity can be obtained from the distances alone, according to:

$$L_{i,j} = I_{i,j} * \frac{d_{i,j}^3}{d_{calib}^3}. \quad (1c)$$

Note that the optical axis of the ToF sensor, which corresponds to the distance $d_{calib}$ in FIG. 4, must be normal to the calibration surface 120 for this latter expression to be accurate.

In the expressions above, the different angles at which the ToF sensor 110 views the calibration surface 120 is compensated using Lambert's cosine law, assuming a diffuse material. Alternatively, a custom function, which might be supplied in the datasheet of the reference material, can be used. The angle $\beta$ can be calculated from the normal vectors of the surface, as seen in FIG. 4.

Note that in the expressions above, the virtual intensity $L_{i,j}$ is calculated with respect to a virtual sphere 130 having a radius $d_{calib}$ that is equal to the distance from the ToF sensor 110 to the calibration surface 120. The virtual intensity is defined with respect to the distance $d_{calib}$. It should be appreciated that the virtual intensity could instead be calculated for a virtual sphere of any arbitrary radius, using the inverse square law, regardless of the dimensions of the calibration setup. Thus, for instance, the virtual intensities could be translated to a virtual sphere having a radius of "1," to simplify subsequent calculations. If the distance from the ToF sensor 110 to the calibration surface 120 is denoted $d_{axis}$, while the distance $d_{calib}$ is understood as an arbitrary calibration distance representing the radius of a virtual sphere that need not touch the calibration surface 120, then the virtual intensity on the virtual sphere with radius $d_{calib}$ is:

$$L_{i,j} = I_{i,j} * \frac{d_{i,j}^3}{d_{axis}^3} * \frac{d_{axis}^2}{d_{calib}^2} * \frac{1}{\cos\beta_{i,j}}.$$

which simplifies to equation (1a):

$$L_{i,j} = I_{i,j} * \frac{d_{i,j}^2}{d_{calib}^2} * \frac{1}{\cos\beta_{i,j}}.$$

Thus it can be seen that $d_{calib}$, the radius of the virtual sphere to which the intensities are projected, can be the same as the distance from the ToF sensor 110 to the calibration surface 120, but need not be.

If the illumination from the light source at the ToF sensor 110 was perfectly uniform, and if the pixels in ToF sensor 110 had perfectly uniform sensitivity, then the virtual intensities $L_{i,j}$ could be expected to be identical. Of course, neither of these assumptions is likely to be true. To address these irregularities, and to translate the intensity values into a reflectance value, a reference calibration factor $c_{i,j}$ can be calculated, based on a reference reflectance $R_{ref}$:

$$c_{i,j} = \frac{1}{L_{i,j}} * R_{ref}. \quad (2)$$

In order to obtain "true" reflectance values, $R_{ref}$ should be the actual value of the reflectance of calibration surface 120 at β=0 (in which case reflectances calculated as discussed below can be expected to fall within the range of 0 to 1). It will be appreciated, however, that this reference reflectance $R_{ref}$ can be set to any arbitrary value, to transform intensity measurements to a desired scale.

Once a calibration factor for a given pixel i, j has been obtained, subsequently obtained intensity measurements obtained from that pixel can be converted into reflectance values. In other words, multiplying a subsequent intensity measurement for pixel i, j with this calibration factor, and correcting to the calibration distance using the inverse square law, results in a reflectance value for pixel j, representing the percentage of light reflected back to the pixel from the imaged object or material:

$$R_{i,j} = c_{i,j} I_{i,j} \frac{d_{i,j}^2}{d_{calib}^2}. \quad (3)$$

It will be appreciated that the term $d_{calib}^2$ is a constant that depends on the calibration setup, rather than any characteristic of the imaged object. Thus, if a "true" reflectance value is not necessary, this term could be neglected, with a reflectance value being obtained by multiplying the intensity measurement $I_{i,j}$ by the reflectance calibration factor $c_{i,j}$ and by any factor proportional to the square of the distance measurement $d_{i,j}$. This will produce a reflectance value that is proportional to the "true" reflectance; appropriate choice of the reflectance calibration factor $c_{i,j}$ allows the results to be normalized to any desired scale.

Thus, it can be seen that distance and intensity measurements to an object or material of instance can be used, along with calibration factors, to obtain calculated reflectance values for the imaged object. As in normal depth sensing, the ToF sensor captures a depth and amplitude image. A depth image may require the capture of 4 or 8 raw images, or exposures, for example. The amplitude/intensity image can be calculated from these same 4 or 8 raw images. The distance of the pixel array to the surface being imaged is invariant to the intensity. But, the distance between the illumination source and the surface needs to be compensated. This is done using the inverse square law, as can be seen in equation (3). The reflectance calibration factor serves to convert the intensity measurements into reflectance values, as well as to correct for nonuniformities in illumination and pixel sensitivity.

The calculated reflectance values can be used in any of a variety of image processing tasks. They can be used to normalize corresponding pixel values or groups of pixel values in a two-dimensional image, for example. The calculated reflectance values can be used to form a reflectance image, or reflectance map, or used as an additional attribute for each point of a pointcloud, such that the pointcloud comprises distance measurements and corresponding reflectance values. The reflectance values can be associated with an RGB image, using the ToF distance measurement for mapping. The reflectance values can be combined with depth and used as input for enhanced object recognition. The reflectance values might be used to detect sweat on human skin, for example—the detected sweat might be used as input to a lie detector algorithm, for instance, or used to adjust a heating or air conditioning unit. A surface of interest can be sensed at different angles, using the techniques described herein, in order to sample the bidirectional reflectance distribution function (BRDF) of the surface. This function is valuable for 3D scanning, as it allows rendering systems photorealistic shading. A ToF system might also feature multiple different illumination units, such as red, blue and green. Taking an image with each of these illumination units active, using the techniques described herein, allow the measurement of the true color of an object, independent of the background illumination. Again, this can be valuable for 3D scanning, if the scanned scene is placed in a virtual environment.

Above, a calibration process using a planar calibration surface was described, with the procedure including a transformation of the intensity values obtained by imaging that surface to a virtual sphere. An actual sphere (or portion of a sphere) could be used instead. Furthermore, whether a planar or spherical calibration surface is used, calibration can be performed separately for each pixel in a ToF sensor, or for each pixel group in the ToF sensor, but need not necessarily be. Calibration may be performed for a subset of pixels or groups of pixels, for example, with the calibration factors so obtained then being interpolated to those pixels or groups of pixels between the calibrated pixels. In this manner, pixel-specific calibration factors may be determined for each pixel or group of pixels, whether or not every pixel or pixel group is individually calibrated. In some instances, for example, the calibration surface may comprise a pattern of reflective and non-reflective (i.e., black) portions. If the precise dimensions of this pattern are known to the calibrating unit, alignment of the calibration surface with respect to the ToF sensor can be evaluated, and adjustments to the calibration process made accordingly. While reflectance calibration of the pixels viewing the non-reflective portions cannot be calibrated directly, nearby pixels viewing reflective portions can, and the reflectance calibration factors from those nearby pixels can be interpolated or extrapolated to the pixels viewing the non-reflective portions of the calibration surface.

It should be further appreciated that if a particular model of ToF camera or other ToF measurement device has well controlled manufacturing characteristics, it may be the case that calibration need not be carried out for every unit. Thus, for example, calibration can be carried out using a reference device, with the calibration factors obtained from that reference device being preloaded into the similar devices. This calibration might be updated from time to time, e.g., using samples from the manufacturing line, to account for drift in the manufacturing process. Of course, the viability of using this approach at all, and perhaps the frequency of updates, depend on the desired accuracy for the reflectance measurements, as some applications may be more tolerant of relatively inaccurate measurements.

Figure 5:
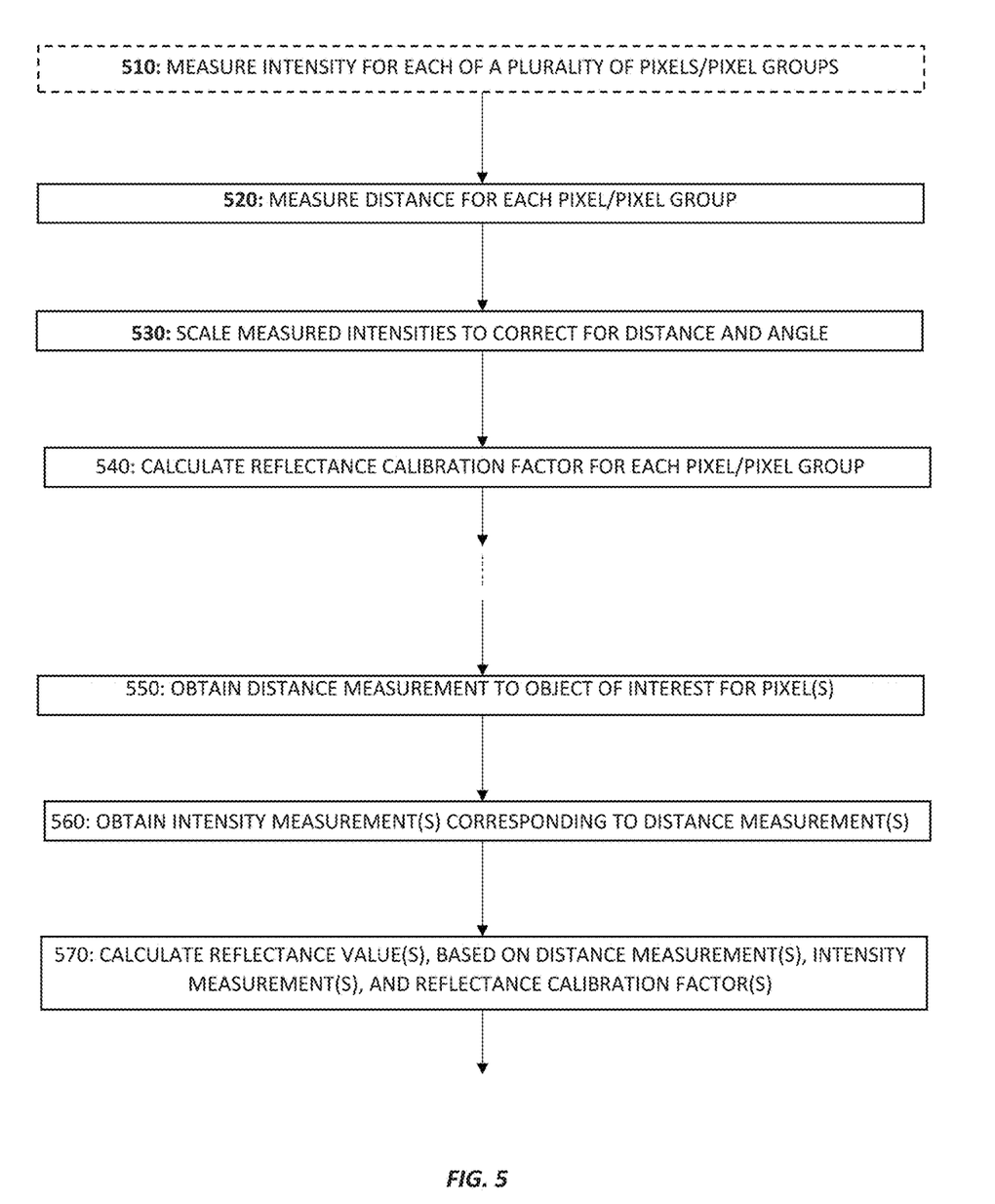
FIG. 5 is a flow diagram illustrating an example method for measuring reflectance using a ToF sensor, according to some embodiments.

In view of the detailed discussion and examples provided above, it will be appreciated that FIG. 5 illustrates an example method, according to the techniques described herein, for calibrating and using a ToF sensor for reflectance measurements. As noted above, calibration might not be performed for all pixels of a given ToF sensor, or even for a given sensor at all. Thus, the procedure shown in FIG. 5 can be divided into a calibration part and a reflectance measurement part, with the understanding that any given device or instance of use may involve only one part or the other, or both.

The illustrated method begins with a calibration procedure, as shown at blocks 510-540. This procedure begins, as shown at block 510, with measuring an intensity of reflection from a calibration surface for each of a plurality of pixels or groups of pixels. As shown at block 520, the procedure may further include measuring the distance to the calibration surface, for each pixel or group of pixels—it will be appreciated that the distance and intensity measurements may be performed at the same time, e.g., where both distance and intensity values are obtained from multiple exposures or phase images of the calibration surface.

As shown at block 530, the calibration procedure continues with the scaling of the measured intensities, for each pixel or group of pixels. This is done to project the measured intensity onto a virtual sphere, for example, and thus corrects for distance and angle. This may be performed as a function of the viewing angle for the respective pixel or group of pixels, the measured distance to the calibration surface for the pixel or pixels, or both. Examples of this scaling operation are shown in equations (1a), (1b), and (1c), above.

As shown at block 540, the calibration procedure continues with the calculating of a reflectance calibration factor, for each pixel or group of pixels, as a function of a reference reflectance and the scaled measured intensity for the pixel or group of pixels. As discussed above, this reference reflectance may represent the actual reflectance of the calibration surface at a viewing angle of zero, but could instead represent an arbitrary factor for scaling intensity to a reflectance value, in some embodiments. This may be done according to equation (2) above, in some embodiments. Note that while FIG. 5 (and the equations above) shows the scaling of the intensity measurement and the calculation of the reflectance calibration factor as two distinct operations, the reflectance calibration factor may be calculated in one step, in some embodiments, with the scaling of the intensity measurement being inherent in that calculation.

Given calibration factors for pixels of the ToF sensor, reflectance measurements can be carried out. An example measurement procedure is shown in FIG. 5 at blocks 550-570. Again, it should be appreciated that this measurement procedure may be carried out separately and independently of the calibration procedure shown in blocks 510-540, e.g., where the reflectance calibration factors are obtained using a different device and simply provided to the ToF measurement device performing the reflectance measurements.

As shown at block 550, the reflectance measurement procedure begins with obtaining a distance measurement to an object or material of interest, using one or more pixels in the ToF sensor. The method further comprises, as shown at block 560, obtaining an intensity measurement corresponding to the distance measurement, using the one or more pixels. It will again be appreciated that the intensity measurement and the distance measurement may be obtained at the same time, e.g., using multiple phase exposures of the object of interest.

As shown at block 570, the method further comprises calculating a reflectance value for the pixel, based on the distance measurement, the intensity measurement, and a reflectance calibration factor. This reflectance calibration factor may be pixel-specific, for instance, and may have been obtained using the steps shown at blocks 510-540, for example, but might also be provided separately, or interpolated from one or more reflectance calibration factors obtained according to the techniques described above. This calculating may comprise multiplying the intensity measurement by the reflectance calibration factor and by a factor proportional to the square of the distance measurement, for example. In some embodiments, as discussed above, the reflectance value is calculated according to equation (3), above.

The steps shown in 550-570 may be carried out for each of several (or many) pixels, e.g., for all of the pixels in a ToF sensor, with the results thus providing a reflectance map of the imaged object or objects. As discussed above, these reflectance values may be used in connection with a depth map and/or an RGB color map, for example, and/or in association with a 3D pointcloud. As indicated above, these reflectance values may be used to enhance object recognition or characterization, in various applications.

Figure 6:
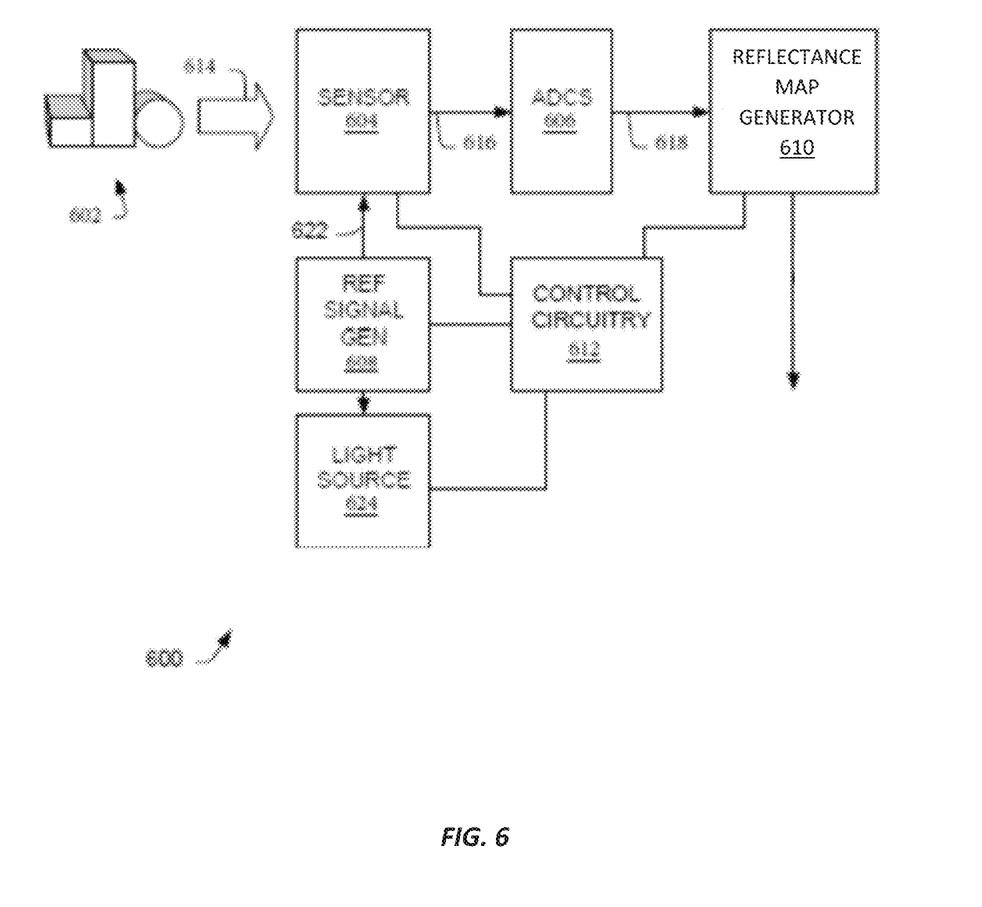
FIG. 6 is a block diagram illustrating components of an example ToF measurement device configured for performing reflectance measurements, according to some embodiments.

FIG. 6 illustrates an example ToF measurement device 600, according to several embodiments of the presently disclosed devices and systems. The ToF measurement device 600 can be utilized to detect objects, e.g., as shown in target scene 602, as well as to determine distances to the detected objects. ToF measurement 600 may also be configured to determine reflectance values of the detected object or objects. ToF measurement device 600 may be a continuous-wave TOF system, such as a photon modulation device (PMD)-based TOF system. ToF measurement device 600 may be further configured to superimpose data on emitted light pulses, according to the techniques described herein, for reception by a remote device.

The illustrated ToF measurement device 600 includes a light source 624, which is configured to amplitude modulate a beam of light with a modulating signal and emit the amplitude-modulated light towards the scene 602. The amplitude modulation may be based on a reference signal generated by reference signal generator 608. The reference signal may be a radio-frequency (RF) signal, e.g., in the MHz range, although other modulation frequencies can be used. The emitted light can include light having varied ranges of wavelength, such as light in the visible spectrum or infra-red radiation. The emitted light reflects from one or more objects in the scene and returns to the sensor 604.

The illustrated ToF measurement device 600 further includes a sensor 604, which comprises a plurality of pixels configured to generate a respective plurality of pixel signal values in response to received light 614, where each pixel is configured to obtain its respective pixel signal value by demodulating received light using a reference signal 622. As seen in FIG. 6, received light 602 may be reflected from a target scene 602. As discussed above, while several suitable pixel configurations are possible, one suitable pixel design is the PMD described above.

The numbers of pixels, rows, and columns can vary, from one embodiment to another, and are selected based on factors including desired resolution, intensity, and the like. In one example, these sensor characteristics are selected based on the objects to be detected and the expected distances to the objects. Thus, for example, the pixel resolution of the pixels in sensor 604 may vary, from one embodiment to another. Small objects require a higher resolution for detection. For example, finger detection requires a resolution of <5 mm per pixel at a distance or range of about 0.5 meters. Medium sized objects, such as hand detection, require a resolution of <20 mm per pixel at a range of about 1.5 meters. Larger sized objects, such as a human body, require a resolution of <60 mm per pixel at about 2.5 meters. It is appreciated that the above examples are provided for illustrative purposes only and that variations can occur including other objects, resolutions and distances for detection. Some examples of suitable resolutions include VGA—640×400 pixels, CIF—352×288 pixels, QQ-VGA—160×120 pixels, and the like.

ToF measurement device 600 further includes a reference signal generator 608, which may be configured, in some embodiments, to generate reference signal 622 with a selectable phase, relative to the phase of a modulation signal applied to light transmitted towards target scene 602, and to provide the reference signal 622 to the plurality of pixels in sensor 604. Image processing system 600 still further includes an analog-to-digital converter (ADC) circuit 606, which may include one or several ADCs, operatively coupled to the plurality of pixels in sensor 604, with ADC circuit 606 providing digital phase or distance measurements to reflectance map generator 610, which may comprise a separate processing circuit and/or digital logic and/or may be a functional unit implemented using the same circuitry making up control circuitry 612.

The illustrated ToF measurement device 600 further includes control circuitry 612, which may comprise, for example a processor, controller, or the like, and/or other digital logic. In several embodiments, the control circuitry 612 is configured to cause the image processing system 600 to carry out a method like those described above, in connection with FIG. 5. Thus, for example, control circuity 612 may be configured to control the light source 624, the sensor 604, and reflectance map generator 610 to obtain a distance measurement to an object or material of interest, using one or more pixels in the sensor, and to obtain an intensity measurement corresponding to the distance measurement, using the one or more pixels. It will again be appreciated that the intensity measurement and the distance measurement may be obtained at the same time, e.g., using multiple phase exposures of the object of interest. Control circuitry 612 may be further configured to control the reflectance map generator to calculate a reflectance value for the pixel, based on the distance measurement, the intensity measurement, and a reflectance calibration factor. This reflectance calibration factor may be pixel-specific, for instance, and may be obtained during a calibration process performed with ToF measurement device 600, for example, or provided to the ToF measurement 600. In some embodiments, as discussed above, the reflectance value is calculated according to equation (3), above.

These operations by control circuitry 612 and reflectance map generator 610 may be carried out for each of several (or many) pixels, e.g., for all of the pixels in sensor 604, with the results thus providing a reflectance map of the imaged object or objects. As discussed above, these reflectance values may be used in connection with a depth map and/or an RGB color map, for example, and/or in association with a 3D pointcloud. As indicated above, these reflectance values may be used to enhance object recognition or characterization, in various applications.

In some embodiments, ToF measurement device 600 may be further configured to carry out a calibration procedure. According to some of these embodiments, control circuitry 612 is configured to control the light source 624, the sensor 604, and reflectance map generator 610 to measure an intensity of reflection from a calibration surface for each of a plurality of pixels or groups of pixels and to measure the distance to the calibration surface, for each pixel or group of pixels—once again, it will be appreciated that the distance and intensity measurements may be performed at the same time, e.g., where both distance and intensity values are obtained from multiple exposures or phase images of the calibration surface. The control circuitry 612 may be further configured to control reflectance map generator 610 to scale the measured intensities, for each pixel or group of pixels, e.g., so as project the measured intensity onto a virtual sphere. This may be performed as a function of the viewing angle for the respective pixel or group of pixels, the measured distance to the calibration surface for the pixel or pixels, or both. Examples of this scaling operation are shown in equations (1a), (1b), and (1c), above. Control circuitry 612 in these embodiments may be further configured to control reflectance map generator 610 to calculate a reflectance calibration factor, for each pixel or group of pixels, as a function of a reference reflectance and the scaled measured intensity for the pixel or group of pixels. As discussed above, this reference reflectance may represent the actual reflectance of the calibration surface at a viewing angle of zero, but could instead represent an arbitrary factor for scaling intensity to a reflectance value, in some embodiments. This may be done according to equation (2) above, in some embodiments. Note that while FIG. 5 (and the equations above) shows the scaling of the intensity measurement and the calculation of the reflectance calibration factor as two distinct operations, the reflectance calibration factor may be calculated in one step, in some embodiments, with the scaling of the intensity measurement being inherent in that calculation.

In view of the detailed discussion above, it will be appreciated that the inventive subject matter described herein may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method, in a time-of-flight (ToF) measurement device, the method comprising:
   obtaining a distance measurement, using one or more pixels in a ToF sensor;
   obtaining an intensity measurement corresponding to the distance measurement, using the one or more pixels; and calculating a reflectance value for the one or more pixels, based on the distance measurement, the intensity measurement, and a reflectance calibration factor, wherein said calculating comprises multiplying the intensity measurement by the reflectance calibration factor and by a factor proportional to the square of the distance measurement.

2. The method of claim 1, wherein the reflectance calibration factor is specific to the one or more pixels in the ToF sensor.

3. The method of claim 1, wherein the reflectance value is calculated according to:

$$R_{i,j} = c_{i,j} I_{i,j} (d_{i,j}/d_{calib})^2,$$

where $R_{i,j}$ is the calculated reflectance value, $c_{i,j}$ is the reflectance calibration factor, $I_{i,j}$ is the intensity measurement, $d_{i,j}$ is the distance measurement, and $d_{calib}$ is a calibration distance for the reflectance calibration factor.

4. The method of claim 1, further comprising using the calculated reflectance value to normalize a pixel value or group of pixel values in a two-dimensional image.

5. The method of claim 1, wherein the method comprises:
obtaining a plurality of distance measurements using the ToF sensor, wherein each distance measurement is obtained using a respective pixel or group of pixels in the ToF sensor;
obtaining an intensity measurement corresponding to each of the distance measurements, using the respective pixels or groups of pixels; and
calculating a reflectance value corresponding to each intensity measurement, based on the intensity measurement, the respective distance measurement, and a respective reflectance calibration factor.

6. The method of claim 5, wherein the respective calibration factors are each specific to a respective pixel or group of pixels.

7. The method of claim 5, wherein, for each respective pixel or group of pixels, said calculating comprises multiplying the intensity measurement for the respective pixel or group of pixels by the reflectance calibration factor for the respective pixel or group of pixels and by a factor proportional to the square of the distance measurement for the respective pixel or group of pixels.

8. The method of claim 5, wherein the reflectance value for each pixel i, j is calculated according to $$R_{i,j} = c_{i,j} I_{i,j} (d_{i,j}/d_{calib})^2, \text{ where:}$$

$R_{i,j}$ is the calculated reflectance value for pixel i, j;
$R_{i,j}$ is the reflectance calibration factor for pixel i, j;
$I_{i,j}$ is the measured intensity for pixel i, j;
$d_{i,j}$ is the distance measurement for pixel i, j; and
$d_{calib}$ is a calibration distance.

9. The method of claim 5, further comprising using the calculated reflectance values to normalize pixel values or groups of pixel values in a two-dimensional image.

10. The method of claim 5, wherein the method further comprises forming a reflectance image from the calculated reflectance values.

11. The method of claim 5, wherein the method further comprises forming a three-dimensional point-cloud comprising the distance measurements and the corresponding reflectance values.

12. The method of claim 5, wherein the method comprises obtaining the calibration distance by:
measuring a reference distance to a calibration surface, using a reference pixel in the ToF sensor, and obtaining the calibration distance from the measured reference distance.

13. The method of claim 5, wherein the method comprises obtaining the reflectance calibration factors by:
calculating the reflectance calibration factor for each of the respective pixels or groups of pixels as a function of a viewing angle for the pixel or group of pixels or a distance to a calibration surface measured by the pixel or group of pixels, or both, and a reference reflectance.

14. The method of claim 13, wherein the function is a function of $R_{ref}/\cos \beta_{i,j}$, where $R_{ref}$ is the reference reflectance and $\beta_{i,j}$ is the viewing angle of the respective pixel or group of pixels, with respect to the optical axis of the ToF sensor.

15. The method of claim 5, wherein the method comprises obtaining the reflectance calibration factors by, for each pixel or group of pixels:
measuring an intensity of reflection from a calibration surface, using the pixel or group of pixels;
scaling the measured intensity, based on the viewing angle for the pixel or group of pixels, with respect to the optical axis of the ToF sensor;
calculating the reflectance calibration factor for the pixel or group of pixels as a function of the scaled measured intensity and a reference reflectance.

16. The method of claim 15, wherein scaling the measured intensity comprises calculating the scaled measured intensity according to $L_{i,j} = i/(\cos \beta_{i,j})^3$, where:
$L_{i,j}$ is the scaled measured intensity for pixel i, j;
$I_{i,j}$ is the measured intensity for pixel i, j; and
$\beta_{i,j}$ is the viewing angle of pixel i, j, with respect to the optical axis of the ToF sensor.

17. The method of claim 15, wherein the method further comprises measuring a distance to the calibration surface for each pixel or group of pixels, and wherein scaling the measured intensity comprises calculating the scaled measured intensity according to $$L_{i,j} = I_{i,j} \left(\frac{dc_{i,j}}{d_{calib}}\right)^2 \left(\frac{1}{\cos\beta_{i,j}}\right),$$

where:
$L_{i,j}$ is the scaled measured intensity for pixel i, j;
$I_{i,j}$ is the measured intensity for pixel i, j;
$dc_{i,j}$ is the measured distance to the calibration surface for pixel i,j;
$\beta_{i,j}$ is the viewing angle of pixel i, j, with respect to the optical axis of the ToF sensor;
$d_{calib}$ is the calibration distance.

18. A time-of-flight (ToF) measurement device, comprising:
a light source configured to emit a series of light pulses formed by amplitude-modulating light with a modulating signal;
a ToF sensor comprising a plurality of pixels configured to generate a respective plurality of pixel signal values in response to received light, wherein each pixel is configured to obtain its respective pixel signal value by demodulating received light using a reference signal;
a reference signal generator configured to generate the reference signal and to provide the reference signal to the plurality of pixels; and control circuitry configured to control the light source, ToF sensor, and a reflectance map generator to:
  obtain a distance measurement, using one or more pixels in the ToF sensor;
  obtain an intensity measurement corresponding to the distance measurement, using the one or more pixels; and
  calculate a reflectance value for the one or more pixels, based on the distance measurement, the intensity measurement, and a reflectance calibration factor, wherein said calculating comprises multiplying the intensity measurement by the reflectance calibration factor and by a factor proportional to the square of the distance measurement.

19. The ToF measurement device of claim 18, wherein the reflectance calibration factor is specific to the one or more pixels in the ToF sensor.

20. The ToF measurement device of claim 18, wherein the reflectance value is calculated according to:

$$R_{i,j} = c_{i,j} I_{i,j} (d_{i,j}/d_{calib})^2,$$

where $R_{i,j}$ is the calculated reflectance value, $c_{i,j}$ is the reflectance calibration factor, $I_{i,j}$ is the intensity measurement, $d_{i,j}$ is the distance measurement, and $d_{calib}$ is a calibration distance for the reflectance calibration factor.

21. The ToF measurement device of claim 18, wherein the control circuitry is configured to control the light source, ToF sensor, and reflectance map generator to:
  obtain a plurality of distance measurements using the ToF sensor, wherein each distance measurement is obtained using a respective pixel or group of pixels in the ToF sensor;
  obtain an intensity measurement corresponding to each of the distance measurements, using the respective pixels or groups of pixels; and
  calculate a reflectance value corresponding to each intensity measurement, based on the intensity measurement, the respective distance measurement, and a respective reflectance calibration factor.

22. The ToF measurement device of claim 21, wherein the respective calibration factors are each specific to a respective pixel or group of pixels.

23. The ToF measurement device of claim 21, wherein, for each respective pixel or group of pixels, the reflectance value is calculated by multiplying the intensity measurement for the respective pixel or group of pixels by the reflectance calibration factor for the respective pixel or group of pixels and by a factor proportional to the square of the distance measurement for the respective pixel or group of pixels.

24. The ToF measurement device of claim 21, wherein the reflectance value for each pixel i, j is calculated according to $$R_{i,j} = c_{i,j} I_{i,j} (d_{i,j}/d_{calib})^2, \text{ where:}$$

$R_{i,j}$ is the calculated reflectance value for pixel i, j;
$c_{i,j}$ is the reflectance calibration factor for pixel i, j;
$I_{i,j}$ is the measured intensity for pixel i, j;
$d_{i,j}$ is the distance measurement for pixel i, j; and
$d_{calib}$ is a calibration distance.

25. The ToF measurement device of claim 21, wherein the control circuitry is configured to control the light source, sensor, and reflectance map generator to measure a reference distance to a calibration surface, using a reference pixel in the ToF sensor, and obtain the calibration distance from the measured reference distance.

26. The ToF measurement device of claim 21, wherein the control circuitry is configured to control the light source, sensor, and reflectance map generator to obtain the reflectance calibration factors by:
  calculating the reflectance calibration factor for each of the respective pixels or groups of pixels as a function of a viewing angle for the pixel or group of pixels or a distance to a calibration surface measured by the pixel or group of pixels, or both, and a reference reflectance.

27. The ToF measurement device of claim 26, wherein the function is a function of $R_{ref}/\cos \beta_{i,j}$, where $R_{ref}$ is the reference reflectance and $\beta_{i,j}$ is the viewing angle of the respective pixel or group of pixels, with respect to the optical axis of the ToF sensor.

28. The ToF measurement device of claim 21, wherein the wherein the control circuitry is configured to control the light source, sensor, and reflectance map generator to obtain the reflectance calibration factors by, for each pixel or group of pixels:
  measuring an intensity of reflection from a calibration surface, using the pixel or group of pixels;
  scaling the measured intensity, based on the viewing angle for the pixel or group of pixels, with respect to the optical axis of the ToF sensor;
  calculating the reflectance calibration factor for the pixel or group of pixels as a function of the scaled measured intensity and a reference reflectance.

29. The ToF measurement device of claim 28, wherein scaling the measured intensity comprises calculating the scaled measured intensity according to $L_{i,j} = I_{i,j}/(\cos \beta_{i,j})^3$, where:
  $L_{i,j}$ is the scaled measured intensity for pixel i, j;
  $I_{i,j}$ is the measured intensity for pixel i, j; and
  $\beta_{i,j}$ is the viewing angle of pixel i, j, with respect to the optical axis of the ToF sensor.

30. The ToF measurement device of claim 28, wherein the wherein the control circuitry is configured to control the light source, sensor, and reflectance map generator to measure a distance to the calibration surface for each pixel or group of pixels, and to scale the measured intensity by calculating the scaled measured intensity according to $$L_{i,j} = I_{i,j} \left(\frac{dc_{i,j}}{d_{calib}}\right)^2 \left(\frac{1}{\cos\beta_{i,j}}\right),$$

where:
  $L_{i,j}$ is the scaled measured intensity for pixel i, j;
  $I_{i,j}$ is the measured intensity for pixel i, j;
  $dc_{i,j}$ is the measured distance to the calibration surface for pixel i,j;
  $\beta_{i,j}$ is the viewing angle of pixel i, j, with respect to the optical axis of the ToF sensor; and
  $d_{calib}$ is the calibration distance.

* * * * *

UNITED STATES PATENT AND TRADEMARK OFFICE
CERTIFICATE OF CORRECTION

PATENT NO. : 11,874,403 B2
APPLICATION NO. : 16/414969
DATED : January 16, 2024
INVENTOR(S) : H. Plank It is certified that error appears in the above-identified patent and that said Letters Patent is hereby corrected as shown below:

In the Claims

Column 15, Line 52 (Claim 8), please change "$R_{i,j}$" to -- $c_{i,j}$ --.

Column 16, Line 53 (Claim 17), please change "sensor;" to -- sensor; and --.

Column 18, Lines 19 & 20 (Claim 28), please change "wherein the wherein the" to -- wherein the --.

Column 18, Lines 40 & 41 (Claim 30), please change "wherein the wherein the" to -- wherein the --.

Signed and Sealed this
Nineteenth Day of March, 2024

Katherine Kelly Vidal
*Director of the United States Patent and Trademark Office*